(12) United States Patent
Oyama et al.

(10) Patent No.: US 11,095,788 B2
(45) Date of Patent: Aug. 17, 2021

(54) DOCUMENT SIZE DETECTION DEVICE, IMAGE READING DEVICE, IMAGE FORMING APPARATUS, DOCUMENT SIZE DETECTING METHOD, AND RECORDING MEDIUM

(71) Applicants: Tadaaki Oyama, Kanagawa (JP); Masamoto Nakazawa, Kanagawa (JP); Hiroki Shirado, Kanagawa (JP); Tomohiro Sasa, Tokyo (JP); Tatsuya Ozaki, Kanagawa (JP); Kohsuke Nambara, Kanagawa (JP)

(72) Inventors: Tadaaki Oyama, Kanagawa (JP); Masamoto Nakazawa, Kanagawa (JP); Hiroki Shirado, Kanagawa (JP); Tomohiro Sasa, Tokyo (JP); Tatsuya Ozaki, Kanagawa (JP); Kohsuke Nambara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/589,329

(22) Filed: Oct. 1, 2019

(65) Prior Publication Data
US 2020/0120225 A1    Apr. 16, 2020

(30) Foreign Application Priority Data
Oct. 11, 2018 (JP) .............................. JP2018-192338

(51) Int. Cl.
*H04N 1/00* (2006.01)
*H04N 1/028* (2006.01)

(52) U.S. Cl.
CPC ..... *H04N 1/00708* (2013.01); *H04N 1/02865* (2013.01); *H04N 1/00034* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,875,104 | A | * | 10/1989 | Kamon | H04N 1/00681 358/400 |
| 4,929,844 | A | * | 5/1990 | Houjiyou | H04N 1/00681 250/559.07 |

(Continued)

FOREIGN PATENT DOCUMENTS

| | | |
|---|---|---|
| CN | 1525240 A | 9/2004 |
| CN | 1619430 A | 5/2005 |

(Continued)

OTHER PUBLICATIONS

Extended European Search Report dated Feb. 27, 2020 in corresponding European Patent Application No. 19195584.8, 11 pages.

(Continued)

*Primary Examiner* — Barbara D Reinier
(74) *Attorney, Agent, or Firm* — Oblon, McClelland, Maier & Neustadt, L.L.P.

(57) ABSTRACT

A document size detection device includes: a light source that irradiates a document placed on placing means with scanning light via the placing means; a reading unit that receives reflection light from the document via the placing means to acquire image data of the document; and circuitry to set an illumination depth of the scanning light at a size detection time when the size is detected, shallower than an illumination depth of the scanning light at an image reading time when an image of the document is read, and detects, at the size detection time, the size based on a difference between first image data acquired in a state in which the scanning light is switched off and second image data acquired in a state in which the scanning light is switched on.

15 Claims, 17 Drawing Sheets

(56) References Cited

U.S. PATENT DOCUMENTS

| | | | |
|---|---|---|---|
| 2001/0035987 A1* | 11/2001 | Ishido | H04N 1/0075 358/475 |
| 2005/0002072 A1 | 1/2005 | Iguchi | |
| 2007/0188638 A1 | 8/2007 | Nakazawa et al. | |
| 2008/0252787 A1 | 10/2008 | Nakazawa et al. | |
| 2009/0237751 A1* | 9/2009 | Ishido | H04N 1/00681 358/483 |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2011/0249069 A1 | 10/2011 | Oyama | |
| 2012/0057211 A1 | 3/2012 | Shirado | |
| 2012/0224205 A1 | 9/2012 | Nakazawa | |
| 2012/0236373 A1 | 9/2012 | Oyama | |
| 2013/0063792 A1 | 3/2013 | Nakazawa | |
| 2014/0029065 A1 | 1/2014 | Nakazawa | |
| 2014/0043629 A1 | 2/2014 | Shirado | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2014/0376063 A1 | 12/2014 | Sasa | |
| 2015/0098117 A1 | 4/2015 | Marumoto et al. | |
| 2015/0116794 A1 | 4/2015 | Nakazawa | |
| 2015/0158309 A1 | 6/2015 | Fujii et al. | |
| 2015/0163378 A1 | 6/2015 | Konno et al. | |
| 2015/0222790 A1 | 8/2015 | Asaba et al. | |
| 2015/0249762 A1 | 9/2015 | Ishida et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0065754 A1 | 3/2016 | Kurahashi | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0219163 A1 | 7/2016 | Shirado et al. | |
| 2016/0268330 A1 | 9/2016 | Nakazawa et al. | |
| 2016/0295138 A1 | 10/2016 | Asaba et al. | |
| 2016/0347052 A1 | 12/2016 | Kawarada et al. | |
| 2016/0366288 A1 | 12/2016 | Sasa et al. | |
| 2016/0373604 A1 | 12/2016 | Hashimoto et al. | |
| 2017/0019547 A1* | 1/2017 | Ozaki | H04N 1/193 |
| 2017/0019567 A1 | 1/2017 | Konno et al. | |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2019/0163112 A1 | 5/2019 | Nikaku et al. | |
| 2019/0166274 A1 | 5/2019 | Ishii et al. | |
| 2019/0166275 A1 | 5/2019 | Ishii et al. | |
| 2019/0208149 A1 | 7/2019 | Asaba et al. | |
| 2019/0238702 A1 | 8/2019 | Ikemoto et al. | |

FOREIGN PATENT DOCUMENTS

| | | | |
|---|---|---|---|
| EP | 2 840 768 A2 | | 2/2015 |
| JP | 1-136460 | | 5/1989 |
| JP | 8-069215 | | 3/1996 |
| JP | 2000-138798 A | | 5/2000 |
| JP | 2007-143032 | * | 6/2007 |
| JP | 2011-066579 | | 3/2011 |
| JP | 2014-035691 | * | 3/2014 |
| JP | 2014-53691 A | | 3/2014 |

OTHER PUBLICATIONS

Chinese Search Report issued in Chinese Application No. CN201910958726.9 dated Apr. 23, 2021, 3 pages.

U.S. Appl. No. 16/269,592, filed Feb. 7, 2019 Masamoto Nakazawa, et al.

U.S. Appl. No. 16/431,954, filed Jun. 5, 2019 Ayumu Hashimoto, et al.

U.S. Appl. No. 16/374,146, filed Apr. 3, 2019 Hideki Hashimoto, et al.

U.S. Appl. No. 16/381,520, filed Apr. 11, 2019 Masamoto Nakazawa, et al.

U.S. Appl. No. 16/533,984, filed Aug. 7, 2019 Masamoto Nakazawa, et al.

U.S. Appl. No. 16/536,575, filed Aug. 9, 2019 Masamoto Nakazawa, et al.

* cited by examiner

MAIN-SCANNING DIRECTION

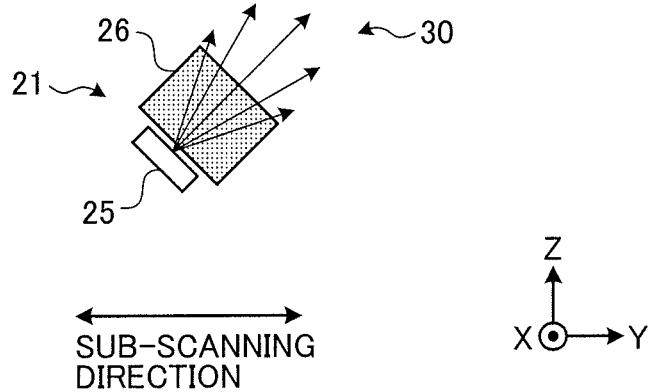
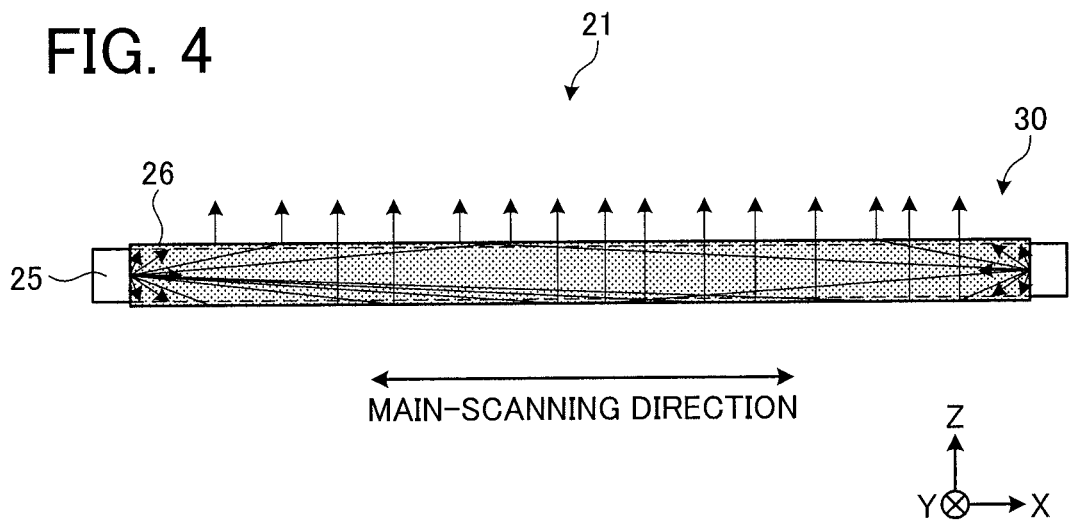
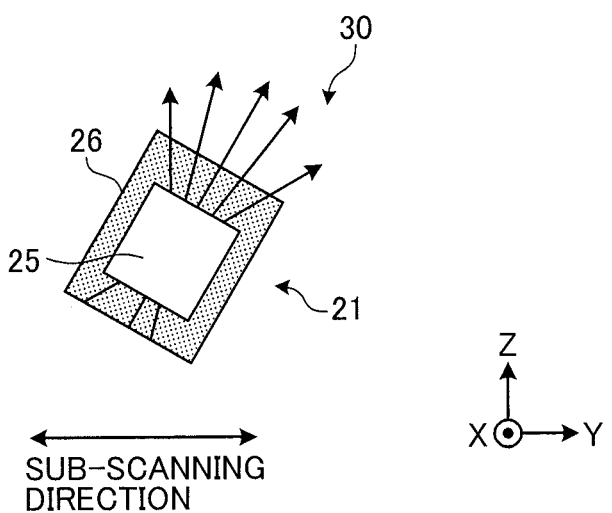

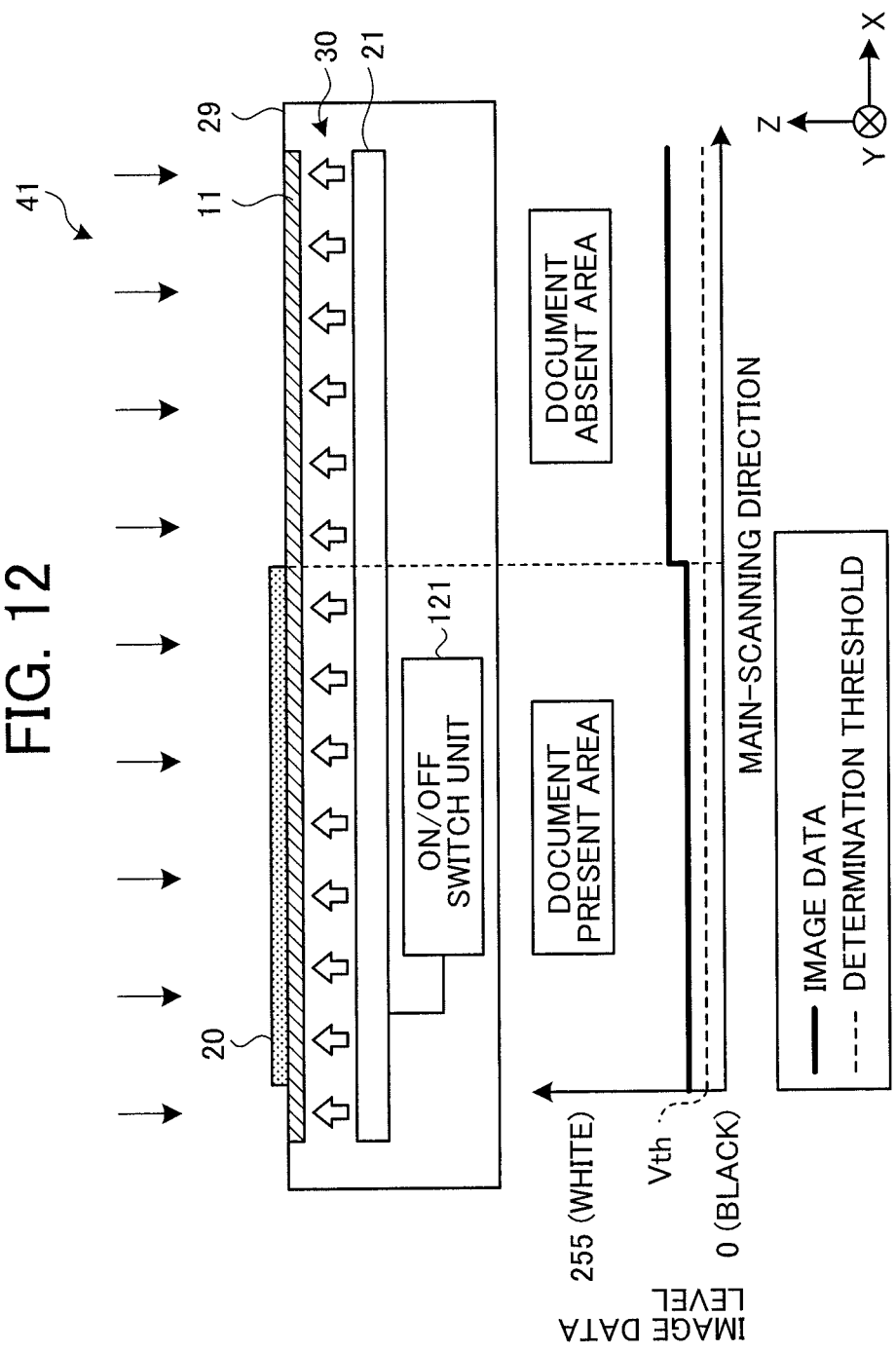

MAIN-SCANNING DIRECTION

MAIN-SCANNING DIRECTION

MAIN-SCANNING DIRECTION

MAIN-SCANNING DIRECTION

— LARGE DRIVE CURRENT  ----- SMALL DRIVE CURRENT

— LARGE DRIVE CURRENT  ----- SMALL DRIVE CURRENT

DOCUMENT SIZE DETECTION DEVICE, IMAGE READING DEVICE, IMAGE FORMING APPARATUS, DOCUMENT SIZE DETECTING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-192338, filed on Oct. 11, 2018, in the Japan Patent Office, the entire disclosure of which is hereby incorporated by reference herein.

BACKGROUND

Technical Field

The present invention relates to a document size detection device, an image reading device, an image forming apparatus, a document size detecting method, and a recording medium.

Discussion of the Background Art

In an image reading device that reads an image of a document, a document size is detected by performing pre-scanning to simply read a part of the document and then performing a main scanning to read an entire image.

The size detection processing includes two types: a normal method in which the pre-scanning is performed only once at a predetermined time before the main scanning; and a two-stage method in which the pre-scanning is performed twice at two different points of time before the main scanning. The two points of time of the pre-scanning in the two-stage method are, for example: a state when a background plate that presses a document against a placing means (such as a contact glass) is opened; a state when the background plate is closed; or the like.

For example, JP-5293524-B2 discloses that a document size is detected based on a difference or a rate between light receiving signals at two lowering positions of a background plate (cover member) in order to prevent an erroneous size determination caused by a color difference of the document.

The normal method has an advantage that the size detection processing can be performed by a simple configuration but has a disadvantage that detection accuracy for a high-density document (such as a document including a black image surface) can be hardly improved. The two-stage method has an advantage that the detection accuracy for a high-density document can be improved but has a disadvantage that a plurality of sensors that detects an angle of the background plate is necessary.

SUMMARY

Example embodiments of the present invention include a document size detection device including: placing means on which a document is placed; illuminating means that irradiates the document with scanning light via the placing means; switching means that switches on or off of the scanning light; illumination depth controlling means that controls an illumination depth of the scanning light; reading means that receives reflection light from the document via the placing means to acquire image data of the document; and detecting means that detects a size of the document based on the image data. The illumination depth controlling means sets an illumination depth of the scanning light at a size detection time when the size is detected, shallower than an illumination depth of the scanning light at an image reading time when an image of the document is read. The detecting means detects, at the size detection time, the size based on a difference between first image data acquired in a state in which the scanning light is switched off and second image data acquired in a state in which the scanning light is switched on.

In one example, the document size detection device includes: a light source configured to irradiate a document placed on placing means with scanning light via the placing means; a reading unit configured to receive reflection light from the document via the placing means to acquire image data of the document; and circuitry configured to switch on or off of the scanning light, control an illumination depth of the scanning light, and detect a size of the document based on the image data acquired by the reading unit. The circuitry sets an illumination depth of the scanning light at a size detection time when the size is detected, shallower than an illumination depth of the scanning light at an image reading time when an image of the document is read, and detects, at the size detection time, the size based on a difference between first image data acquired in a state in which the scanning light is switched off and second image data acquired in a state in which the scanning light is switched on.

Example embodiments of the present invention include an image reading device including the above-described document size detection device, and an image forming apparatus including the image reading device and an image forming device.

Example embodiments of the present invention include a document size detection method, performed by the above-described document size detection device, and a recording medium storing a plurality of instructions which, when executed, cause one or more processors to perform the document size detection method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a side view illustrating the first exemplary configuration of the light source according to the embodiment;

FIG. 4 is a front view illustrating a second exemplary configuration of the light source according to the embodiment;

FIG. 5 is a side view illustrating a second exemplary configuration of the light source according to the embodiment;

FIG. 12 is a diagram illustrating exemplary lit-state image data in a case of setting the determination threshold relatively low;

Figure 1:
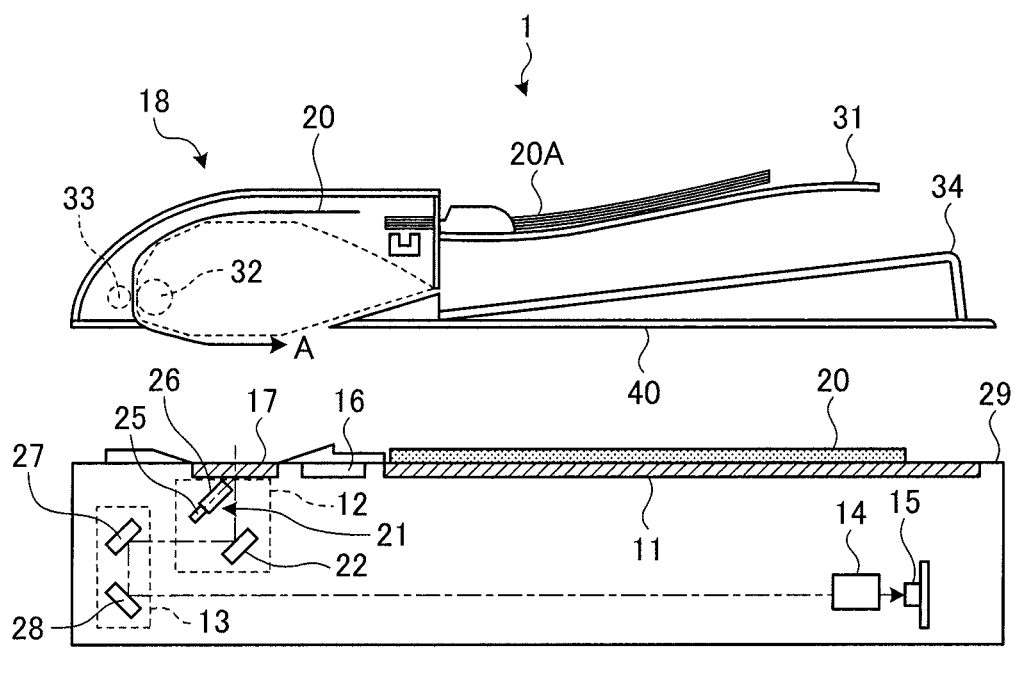
FIG. 1 is a view illustrating an exemplary hardware configuration of an image reading device according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following, embodiments of a document size detection device, an image reading device, an image forming apparatus, and a document size detecting method will be described in detail with reference to the attached drawings. The present invention is not limited by the following embodiments, and constituent elements in the following embodiments include those easily conceivable by a man skilled in the art, substantially the same, and included in so-called equivalent scopes. Various omissions, substitutions, changes, and combinations of the constituent elements can be made without departing from the gist of the following embodiments.

Hardware Configuration of Image Reading Device

FIG. 1 is a view illustrating an exemplary hardware configuration of an image reading device 1 according to an embodiment. The image reading device 1 according to the present embodiment is a scanner device mounted on an image forming apparatus such as a digital copy machine, a digital multifunction peripheral, or a facsimile machine. The image reading device 1 may be a single scanner device. The image reading device 1 includes a document size detection device that detects a size of a document 20 to be a target of image reading. In the drawing, an X-axis corresponds to a main-scanning direction, a Y-axis corresponds to a sub-scanning direction, and a Z-axis corresponds to a height direction.

As illustrated in FIG. 1, the image reading device 1 according to the present embodiment includes a contact glass 11 (placing means), a first carriage 12, a second carriage 13, a lens unit 14, an imaging element 15, and a reference white board 16, a slit 17, and an auto document feeder (ADF) 18.

The contact glass 11 is a transparent plate-shaped member on which a document 20 to be a target of image reading is placed.

The first carriage 12 is a unit including a light source 21 and a first mirror 22 and being movable in the sub-scanning direction (Y-axis direction) by a drive mechanism such as a stepping motor. The light source 21 is a unit that emits scanning light toward the contact glass 11 (document 20), and includes an LED 25 and a light guide 26 in the present embodiment. The light source 21 emits the scanning light in order to perform: size detection processing to detect a size of the document 20; and image reading processing to read an image of the document 20. The first mirror 22 reflects, to the second carriage 13 side, reflection light of the scanning light emitted from the light source 21.

Figure 2:
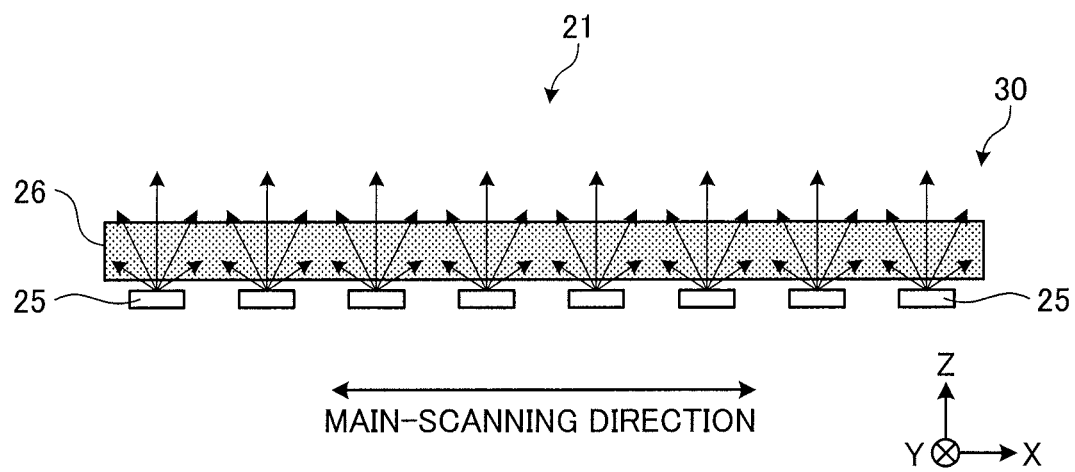
FIG. 2 is a front view illustrating a first exemplary configuration of a light source according to the embodiment.

FIG. 2 is a front view (view seen from the sub-scanning direction) illustrating a first exemplary configuration of the light source 21 according to the embodiment. FIG. 3 is a side view (view seen from the main-scanning direction) illustrating the first exemplary configuration of the light source 21 according to the embodiment. The light source 21 according to the present exemplary configuration is of an array type in which a plurality of small LEDs 25 is uniformly arrayed on a lower surface (opposite surface of a surface facing the contact glass 11 and the slit 17) of the light guide 26 having a rectangular parallelepiped shape in which a longitudinal direction is along the main-scanning direction. With supply of drive current from a power supply circuit, each of the LEDs 25 emits light toward the inside of the light guide 26. The light from each of the LEDs 25 passes through the light guide 26, thereby emitting linear scanning light 30 toward the contact glass 11 and the slit 17 along the main-scanning direction.

FIG. 4 is a front view illustrating a second exemplary configuration of the light source 21 according to the embodiment. FIG. 5 is a side view illustrating the second exemplary configuration of the light source 21 according to the embodiment. The light source 21 according to the present exemplary configuration is of a light guide type in which one or two LEDs 25 is/are arranged on a side surface of the light guide 26. With supply of the drive current to the LED/LEDs 25, the light from the LED/LEDs 25 is emitted to the inside of the light guide 26, and the linear scanning light 30 along the main-scanning direction is emitted toward the contact glass 11 or the slit 17.

Since an emission component having a large angle from a light emitting surface of each LED 25 gives dominant influence on illuminance in the height direction (Z-axis direction), a practically sufficient amount of the scanning light 30 can be emitted in both of the first exemplary configuration and the second exemplary configuration.

Returning to FIG. 1, the description of the configuration of the image reading device 1 will be continued. The second carriage 13 includes a second mirror 27 and a third mirror 28 and is movable in the sub-scanning direction by a drive mechanism such as a stepping motor. The second mirror 27 reflects reflection light from the first carriage 12 (first mirror 22) to the third mirror 28. The third mirror 28 reflects reflection light from the second mirror 27 to the lens unit 14.

The lens unit 14 condenses reflection light from the second carriage 13 (third mirror 28).

The imaging element 15 is a complementary metal-oxide semiconductor (CMOS) color image sensor or the like, receives the reflection light condensed by the lens unit 14, and photoelectrically converts the reflection light.

The reference white board 16 (an example of reference color member) is a white plate-shaped member to reflect light to be a reference in a case where the scanning light 30 is emitted from the light source 21. Image data obtained by photoelectrically converting the reflection light from the reference white board 16 is used for shading correction, size detection processing described later, and the like.

The slit 17 is a portion including a transparent plate-shaped member, similarly to the contact glass 11. During the reading processing using the ADF 18, the document 20 is irradiated with the scanning light 30 via the slit 17 and the reflection light from the document 20 is received.

The ADF 18 is a device used at the time of reading documents 20 one by one from a document bundle 20A including a plurality of documents 20. A background plate 40 that presses each document 20 against the contact glass 11 is provided on a lower surface of the ADF 18. The ADF 18 is attached to a housing 29 of the image reading device 1 via a connecting member such as a hinge. The ADF 18 includes a placement table 31, sheet feeding rollers 32 and 33, and a sheet ejector 34. With rotation of the sheet feeding rollers 32 and 33, the documents 20 are separated one by one from the document bundle 20A placed on the placement table 31 and fed to the slit 17. The documents 20 having passed through the slit 17 are sequentially ejected to the sheet ejector 34.

The first carriage 12 and the second carriage 13 are respectively moved by the stepping motors or the like in the sub-scanning direction while the light source 21 emits the scanning light at the time of normal image reading in which each document 20 is placed on the contact glass 11 and an image of the document 20 is read. At this time, the second carriage 13 is moved at half a speed of the first carriage 12 in order to keep a constant optical path length from the contact glass 11 to the imaging element 15.

When an image surface of the document 20 is irradiated with the scanning light 30, reflection light from the image surface passes through the first mirror 22, the second mirror 27, the third mirror 28, and the lens unit 14 and is subjected to image formation at the imaging element 15. The imaging element 15 photoelectrically converts, per pixel, the received reflection light (that has been subjected to the image formation). A signal that has been photoelectrically converted is converted into a digital signal. Thus, the image of the document 20 is read to acquire digital image data.

In a case of automatically feeding and reading the documents 20 by the ADF 18, the first carriage 12 and the second carriage 13 are moved to the lower side of the slit 17. After that, the documents 20 are automatically fed one by one in an arrow A direction (sub-scanning direction) from the document bundle 20A placed on the placement table 31, and an image surface of each document 20 is scanned at a position of the slit 17.

At this time, the image surface of each document 20 automatically fed is irradiated with the scanning light 30 emitted from the light source 21 of the first carriage 12, and the image of the document 20 is read to acquire a digital image data in a manner similar to at the time of the above-described normal image reading. The document 20 for which the image reading has been completed is ejected to the sheet ejector 34.

Functional Configuration of Document Size Detection Device

Figure 6:
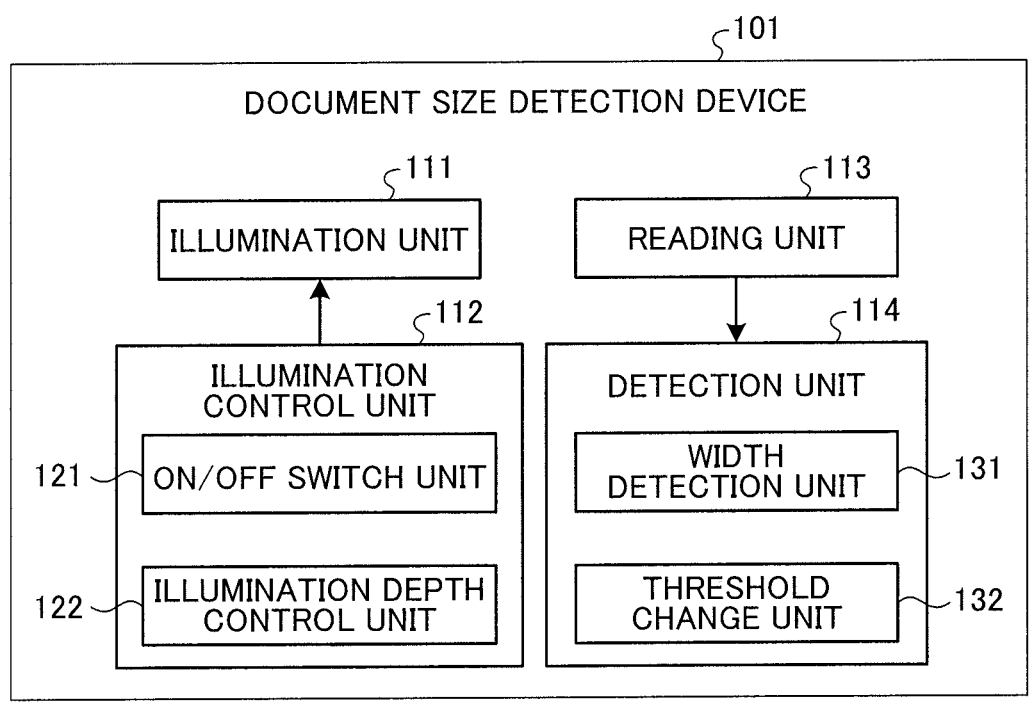
FIG. 6 is a block diagram illustrating an exemplary functional configuration of a document size detection device according to the embodiment.

FIG. 6 is a block diagram illustrating an exemplary functional configuration of a document size detection device 101 according to the embodiment. The document size detection device 101 is provided in the image reading device 1 and performs the size detection processing to detect a size of a document 20 before the image reading processing is started.

An illumination unit 111 is a mechanism that irradiates the document 20 with the scanning light 30 in order to detect the size of the document 20. The illumination unit 111 includes the light source 21 and the like.

An illumination control unit 112 is a mechanism that controls the illumination unit 111. The illumination control unit 112 is implemented by cooperative operation of a central processing unit (CPU), a program that controls the CPU, a power supply circuit, and various other logic circuits. The illumination control unit 112 includes an ON/OFF switch unit 121 (switching means) and an illumination depth control unit 122 (illumination depth controlling means).

The ON/OFF switch unit 121 switches on (ON) and switches off (OFF) the scanning light 30 at the time of size detection to detect the size of the document 20 placed on the contact glass 11.

The illumination depth control unit 122 changes an illumination depth characteristic of the illumination unit 111 (light source 21) between at the time of the size detection and at the time of the image reading. The illumination depth characteristic is a characteristic relating to an illuminance distribution of the scanning light 30 in a space above the contact glass 11. The illumination depth control unit 122 according to the present embodiment makes an illumination depth at the time of the size detection shallower an illumination depth at the time of the image reading (deteriorates the illumination depth characteristic). A method of changing the illumination depth characteristic is not particularly limited, but may include a method of changing, for example, the drive current supplied to each LED 25 constituting the light source 21. Having the shallow illumination depth corresponds to having a large illuminance change in response to a change in a height from the contact glass 11, and having a deep illumination depth corresponds to having a small illuminance change in response to the change in the height from the contact glass 11. Changing the illumination depth characteristic so as to make the illumination depth shallow may be expressed as deteriorating the illumination depth.

A reading unit 113 is a mechanism that acquires image data by receiving incident light that passes through the contact glass 11 and enters the inside of the housing 29 of the image reading device 1. The incident light includes: reflection light from each document 20 placed on the contact glass 11; and ambient light (disturbance light) incident from a portion of the contact glass 11 on which no document 20 is placed. The reading unit 113 is implemented by cooperative operation of the first to third mirrors 22, 27, and 28, the lens unit 14, the imaging element 15, an analog to digital (AD) conversion circuit, other appropriate logic circuits, and the like.

A detection unit 114 is a mechanism that detects a size of each document 20 based on image data acquired by the reading unit 113. The detection unit 114 is implemented by cooperative operation of a CPU, a program that controls the CPU, various logic circuits, and the like. The detection unit 114 includes a width detection unit 131 and a threshold change unit 132.

The width detection unit 131 detects a width of each document 20 placed on the contact glass 11, that is, a length of the document 20 in the main-scanning direction (X-axis direction) based on the image data acquired by the reading unit 113. Information indicating the detected width is used to identify an entire size and a shape (such as A4 or B5) of the document 20.

The threshold change unit 132 sets a threshold of an image data level (hereinafter referred to as a determination threshold) lower than that at the time of the normal operation (at the time of the image reading, for example). The threshold is used to determine whether the document 20 is present or not on the contact glass 11 at the time of the size detection (width detection). Since the determination threshold is set low, a document 20 having a high-density image surface is easily detected. The high-density image surface represents, for example, an image surface having a color having high absorbance, such as black.

Size Detection Processing in Document Size Detection Device

Figure 7:
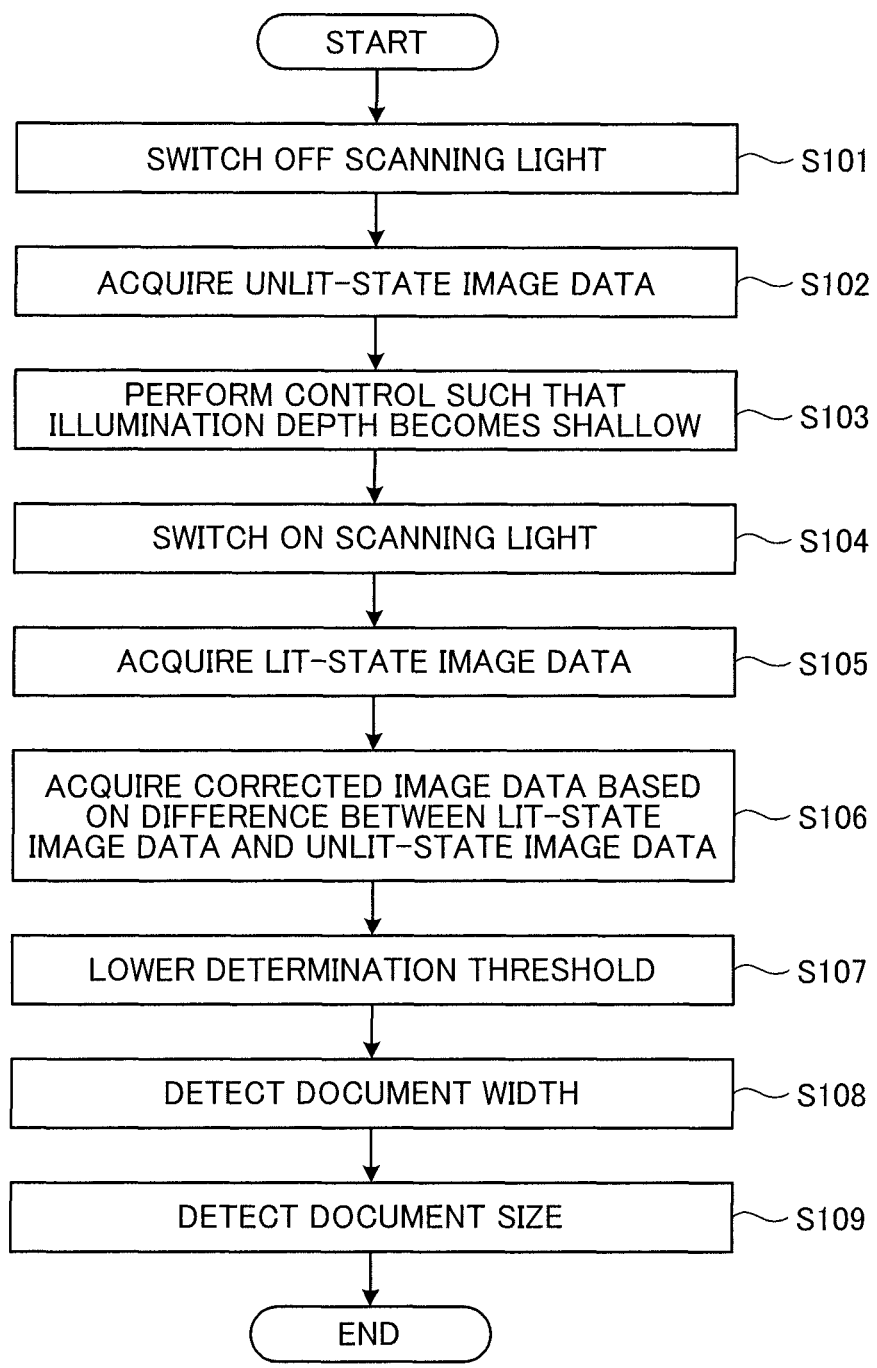
FIG. 7 is a flowchart illustrating exemplary size detection processing in the document size detection device according to the embodiment.

FIG. 7 is a flowchart illustrating exemplary size detection processing in the document size detection device 101 according to the embodiment. The size detection processing to detect a size of each document 20 is normally performed before starting the image reading processing to read an image of the document 20.

When the size detection processing is started, the ON/OFF switch unit 121 of the illumination control unit 112 causes the illumination unit 111 to switch off the scanning light 30 (S101). The reading unit 113 acquires image data in a state in which the scanning light 30 is switched off (S102). In the following, the image data acquired in the state in which the scanning light 30 is switched off will be referred to as unlit-state image data (first image data).

Figure 8:
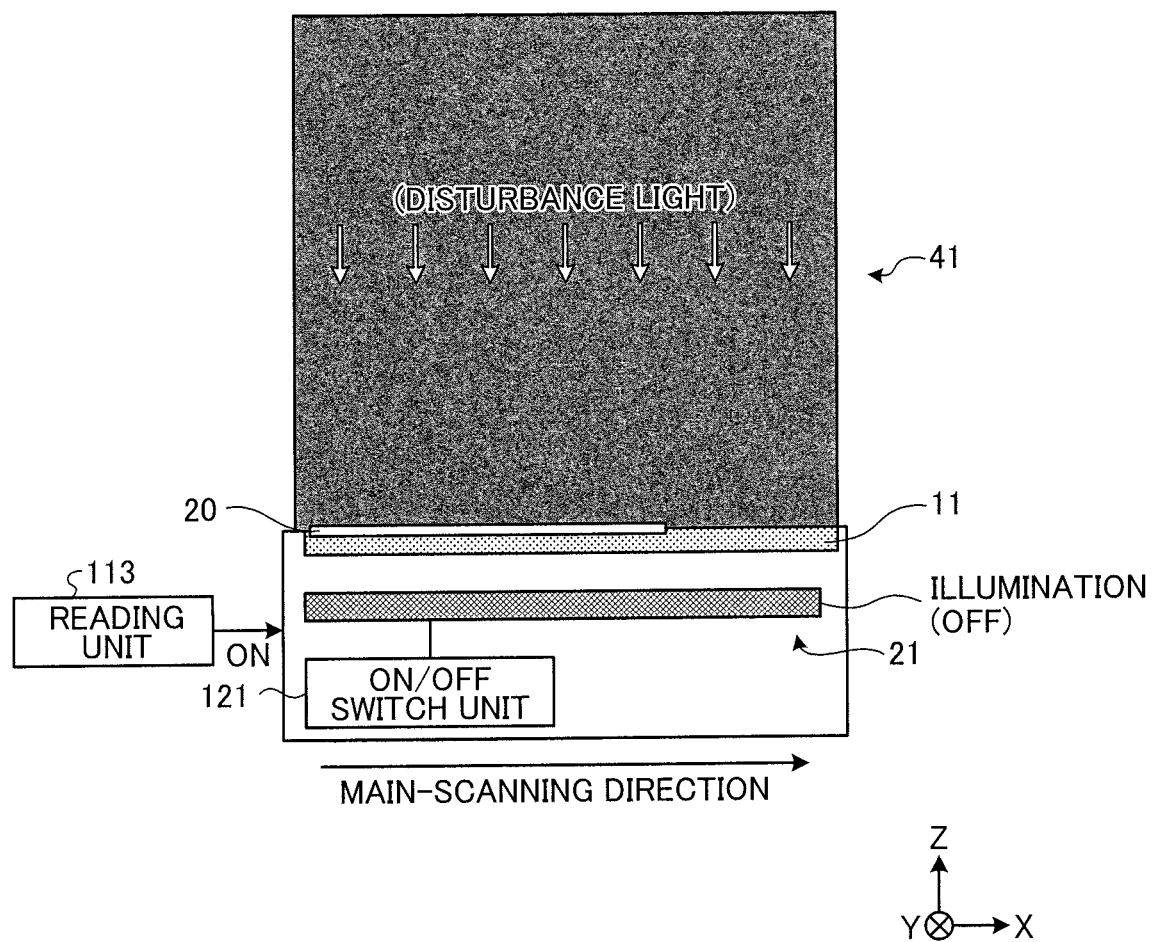
FIG. 8 is a diagram illustrating an exemplary state at the time of acquiring unlit-state image data in the embodiment.

FIG. 8 is a diagram illustrating an exemplary state at the time of acquiring unlit-state image data according to the embodiment. At this time, the reading unit 113 acquires the image data (unlit-state image data) in a state in which the light source 21 is switched off by the ON/OFF switch unit 121. At this time, in a case where disturbance light 41 is present, the unlit-state image data includes a value corresponding to the disturbance light 41.

Returning to FIG. 7, the description of the size detection processing will be continued. After that, the illumination depth control unit 122 of the illumination control unit 112 controls the illumination unit 111 such that an illumination depth of the scanning light 30 becomes shallower than an illumination depth at the time of the image reading (S103), and the ON/OFF switch unit 121 causes the illumination unit 111 to switch on the scanning light 30 (S104). The reading unit 113 acquires image data in a state in which the scanning light 30 having the illumination depth shallower than that at the time of the image reading is switched on (S105). Note that such execution timing of the control for the illumination depth (S103) is not limited to the above, and it is sufficient that the timing is before acquiring the lit-state image data (S105). In the following, the image data acquired in the state in which the scanning light 30 is switched on will be referred to as lit-state image data (second image data).

Figure 9:
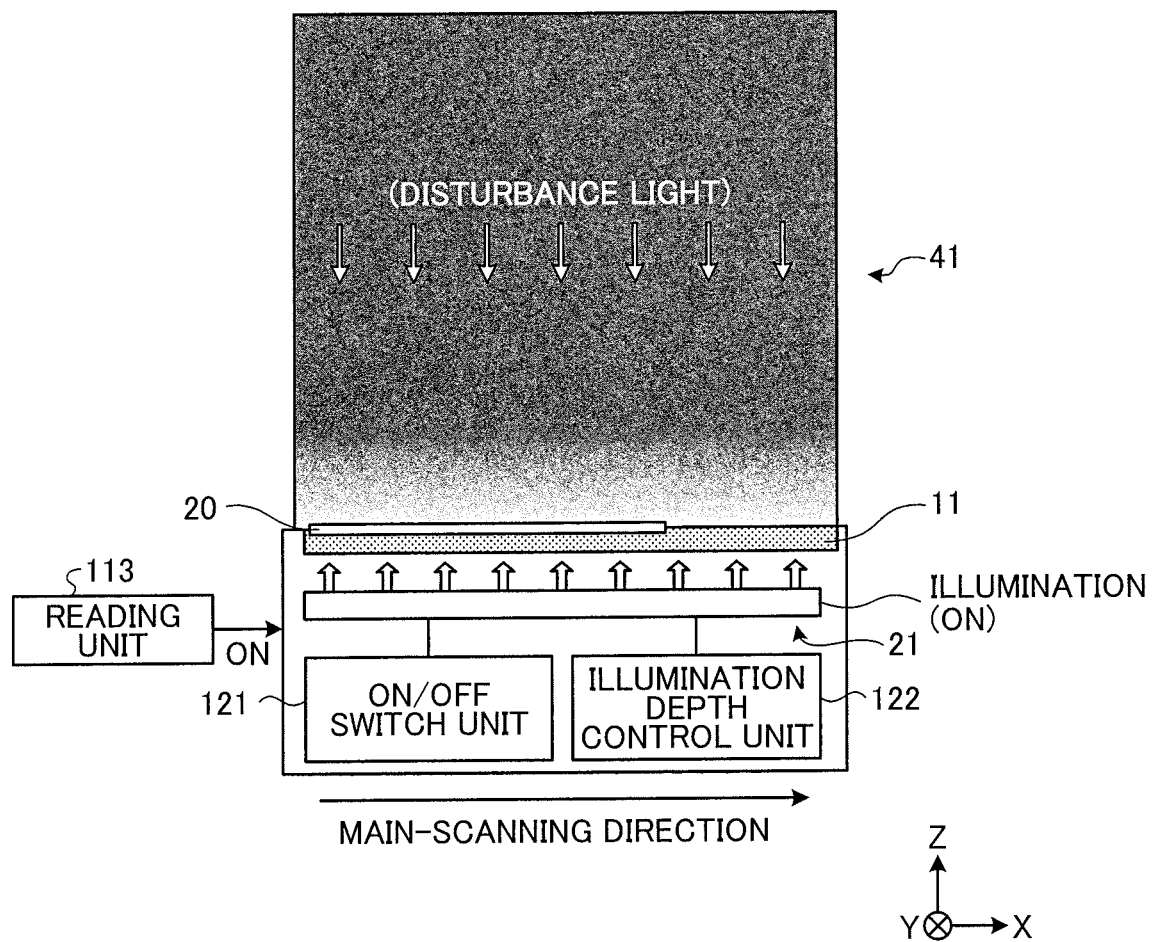
FIG. 9 is a diagram illustrating an exemplary state at the time of acquiring lit-state image data in the embodiment.

FIG. 9 is a diagram illustrating an exemplary state at the time of acquiring the lit-state image data in the embodiment. At this time, the light source 21 is switched on by the ON/OFF switch unit 121, and the illumination depth control unit 122 makes the illumination depth of the scanning light unit 30 shallower than the illumination depth at the time of the image reading. The reading unit 113 acquires the image data (lit-state image data) in a state in which the scanning light 30 having the illumination depth shallower than that at the time of the image reading is switched on. At this time, in a case where the document 20 and the disturbance light 41 are present, the lit-state image data includes: a value corresponding to reflection light from the document 20; and a value corresponding to the disturbance light 41.

Returning to FIG. 7, the description of the size detection processing will be continued. After that, the width detection unit 131 of the detection unit 114 acquires, based on a difference between the lit-state image data and the unlit-state image data, corrected image data in which influence of the disturbance light 41 has been eliminated (S106). The threshold change unit 132 of the detection unit 114 lowers the determination threshold more than at the time of normal processing (e.g., at the time of the image reading). The determination threshold is used to determine that the document 20 is present on the contact glass 11 (S107). The width detection unit 131 detects a width (length in the main-scanning direction) of the document 20 by using: the corrected image data acquired in step S106; and the determination threshold lowered in step S107 (S108). The detection unit 114 detects the entire size of the document 20 based on the detected width of the document 20 (S109).

About Determination Threshold

Figure 10:
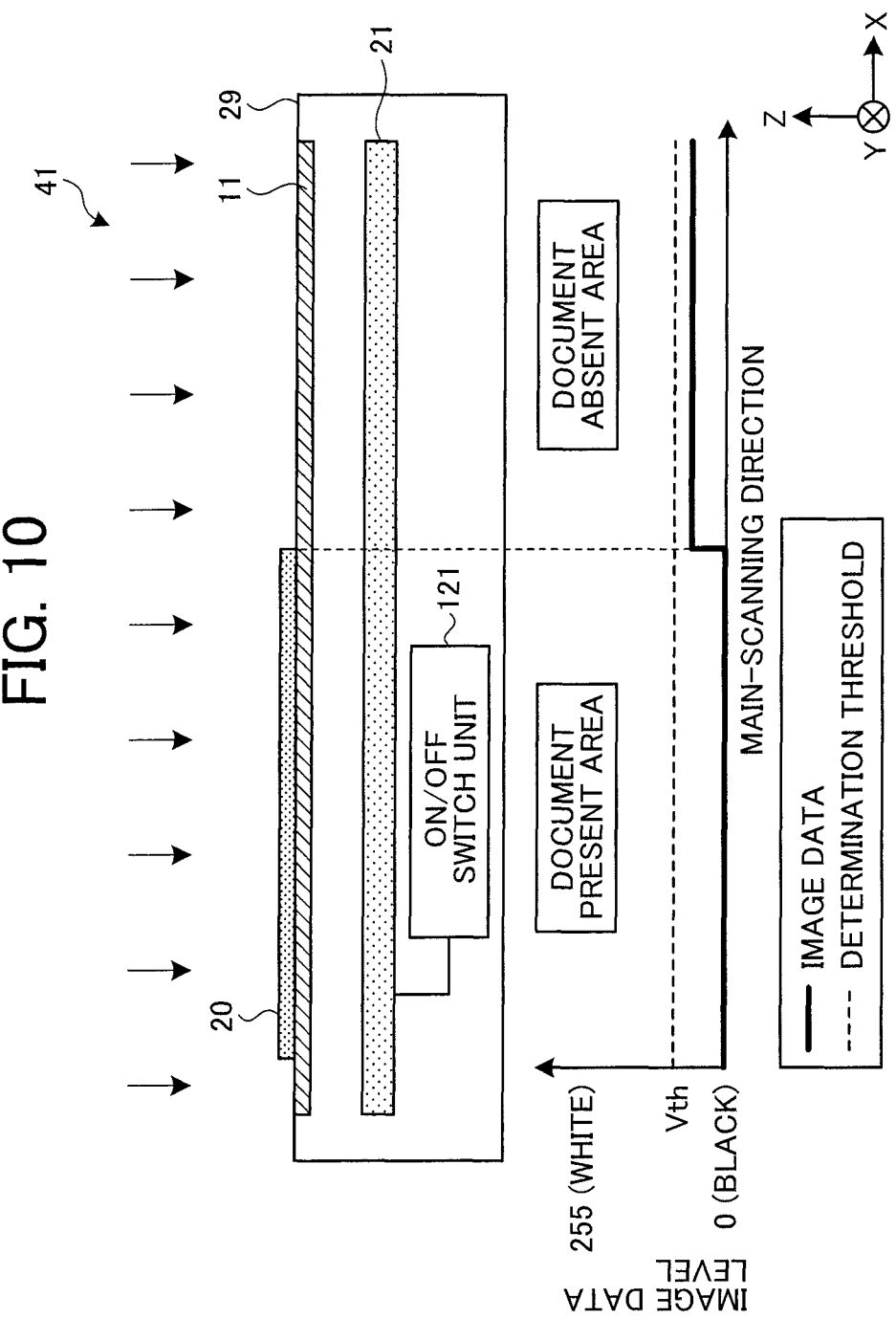
FIG. 10 is a diagram illustrating exemplary unlit-state image data in a case of setting a determination threshold relatively high.

FIG. 10 is a diagram illustrating exemplary unlit-state image data in a case of setting a determination threshold Vth relatively high. At this time, since the scanning light 30 is not emitted from the light source 21, an image data level of an area where the document 20 is present (document present area) is approximately zero. Furthermore, an image data level influenced by the disturbance light 41 that enters the inside of the housing 29 from an area where the document 20 is absent (document absent area) through the contact glass 11 becomes high. At this time, as illustrated in FIG. 10, when the determination threshold Vth is set to a relatively high value, the image data level influenced by the disturbance light 41 in the document absent area hardly exceeds the determination threshold Vth. Thus, a possibility of erroneously determining that the document 20 is present in the document absent area can be reduced.

Figure 11:
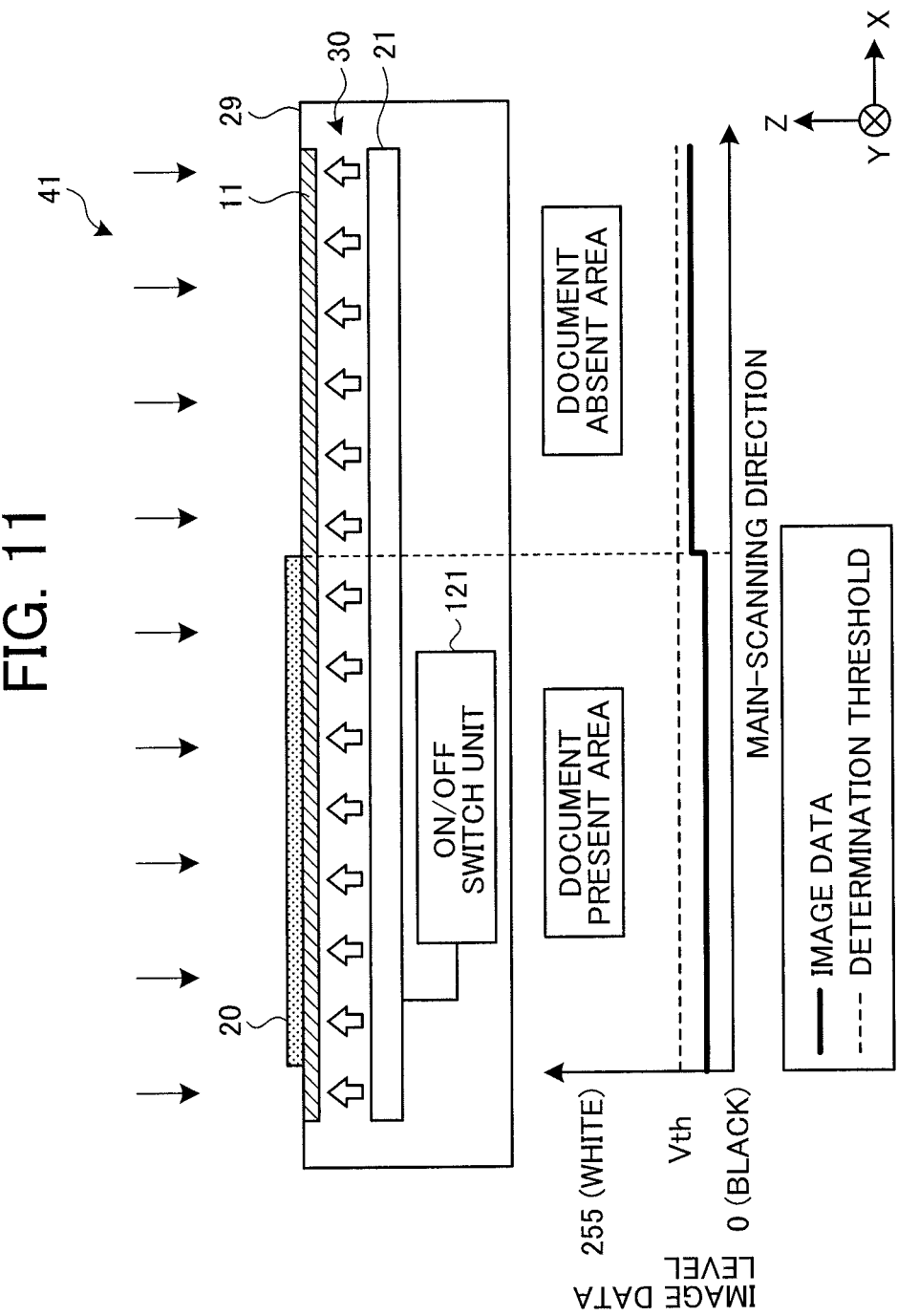
FIG. 11 is a diagram illustrating exemplary lit-state image data in a case of setting the determination threshold relatively high.

FIG. 11 is a diagram illustrating exemplary lit-state image data in a case of setting the determination threshold Vth relatively high. At this time, an image data level of the document present area becomes high due to the reflection light from the document 20. However, in a case where an image surface of the document 20 has a high density, the image data level of the document present area becomes relatively low, and may become lower than the image data level influenced by the disturbance light 41 in the document absent area. In this case, as illustrated in FIG. 11, the image data level of the document present area does not exceed the determination threshold Vth, and the document 20 is not detected.

FIG. 12 is a diagram illustrating exemplary lit-state image data in a case of setting the determination threshold Vth relatively low. Thus, since the determination threshold Vth is relatively low, the image data level of the document present area easily exceeds the determination threshold Vth. Therefore, the document 20 having a high-density image surface can be easily detected. However, since the image data level of the document absent area also similarly easily exceeds the determination threshold Vth, there is a high possibility of erroneously determining that the document 20 is present in the document absent area.

Thus, the influence of the disturbance light 41 can be reduced by setting the determination threshold Vth relatively high, but detection accuracy for the document 20 having the high-density image surface is deteriorated. On the other hand, the detection accuracy for the document 20 having the high-density image surface can be improved by setting the determination threshold Vth relatively low. However, the influence of the disturbance light 41 is easily received. Accordingly, to reduce the influence of the disturbance light 41 while setting the determination threshold Vth relatively low, a difference between the lit-state image data and the unlit-state image data is used in the present embodiment.

Elimination of Influence of Disturbance Light Based on Difference Between Lit-State Image Data and Unlit-State Image Data The influence of the disturbance light 41 can be eliminated based on the difference between the lit-state image data acquired in the state in which the scanning light 30 is switched on and the unlit-state image data acquired in the state in which the scanning light 30 is switched off.

Figure 13A:
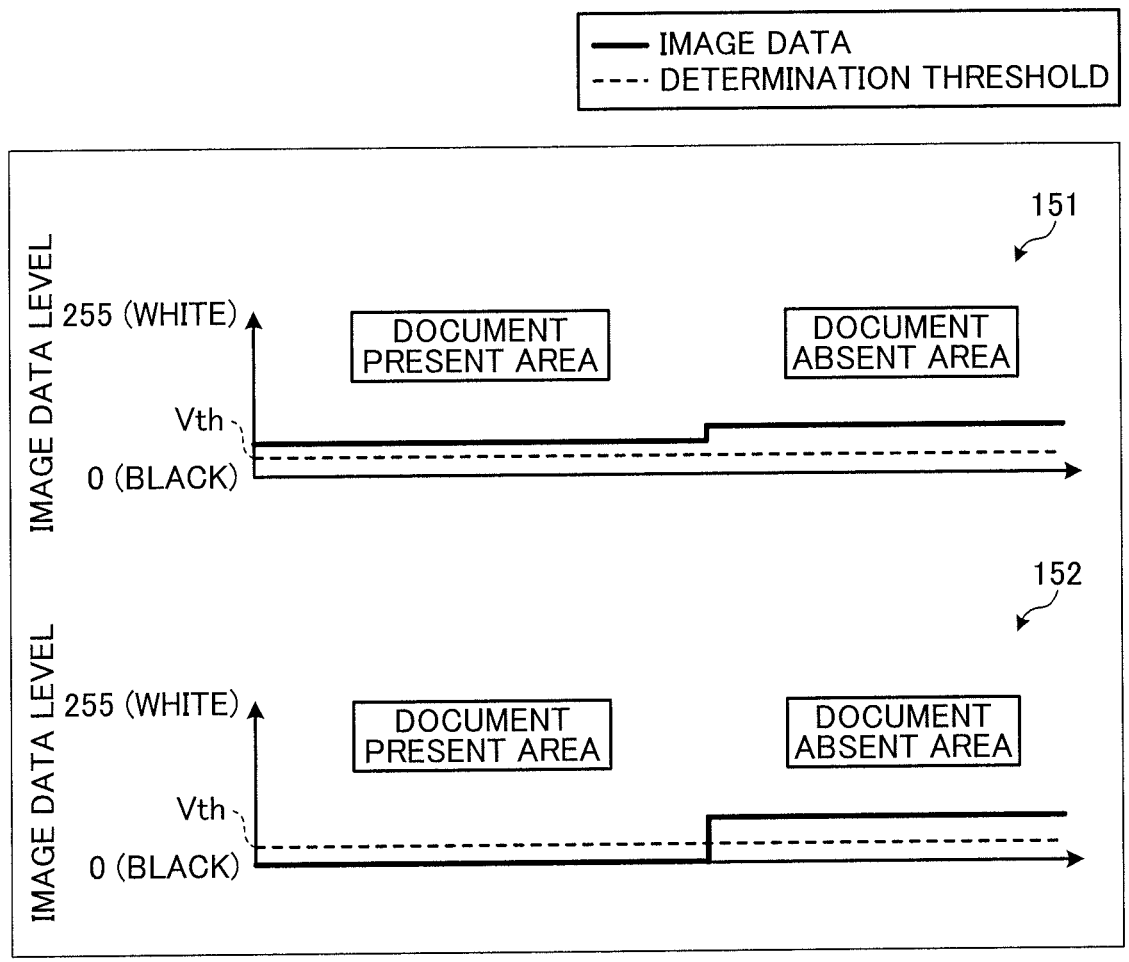
FIGS. 13A and 13B are diagrams illustrating exemplary corrected image data acquired based on a difference between the lit-state image data and the unlit-state image data.
Figure 13B:
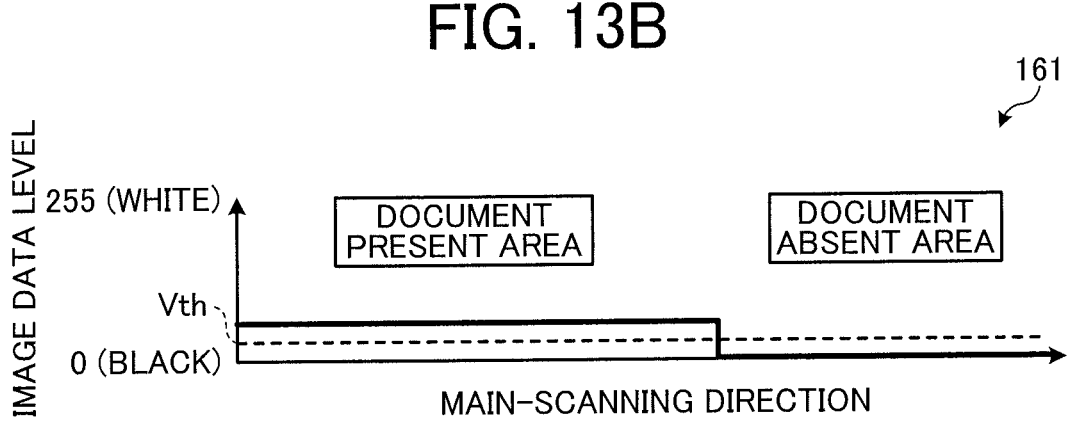

FIGS. 13A and 13B are diagrams illustrating exemplary corrected image data 161 acquired based on a difference between lit-state image data 151 and unlit-state image data 152. FIGS. 13A and 13B illustrate: the lit-state image data 151 acquired in the state in which the scanning light 30 is switched on; the unlit-state image data 152 acquired in the state in which the scanning light 30 is switched off; and the corrected image data 161 acquired by subtracting a level value of the unlit-state image data 152 from a level value of the lit-state image data 151. Since increase in the image data level influenced by the disturbance light 41 appears in both of the lit-state image data 151 and the unlit-state image data 152, the image data level influenced by the disturbance light 41 can be eliminated by taking a difference between the two kinds of the image data 151 and 152. With the above-described processing, it is possible to acquire the corrected image data 161 from which the influence of the disturbance light 41 in the document absent area is eliminated.

Image Data Acquiring Position

Intensity of the disturbance light 41 may be varied depending on a position on the contact glass 11. Therefore, a position of acquiring the unlit-state image data preferably coincides with a position of acquiring the lit-state image data.

Figure 14:
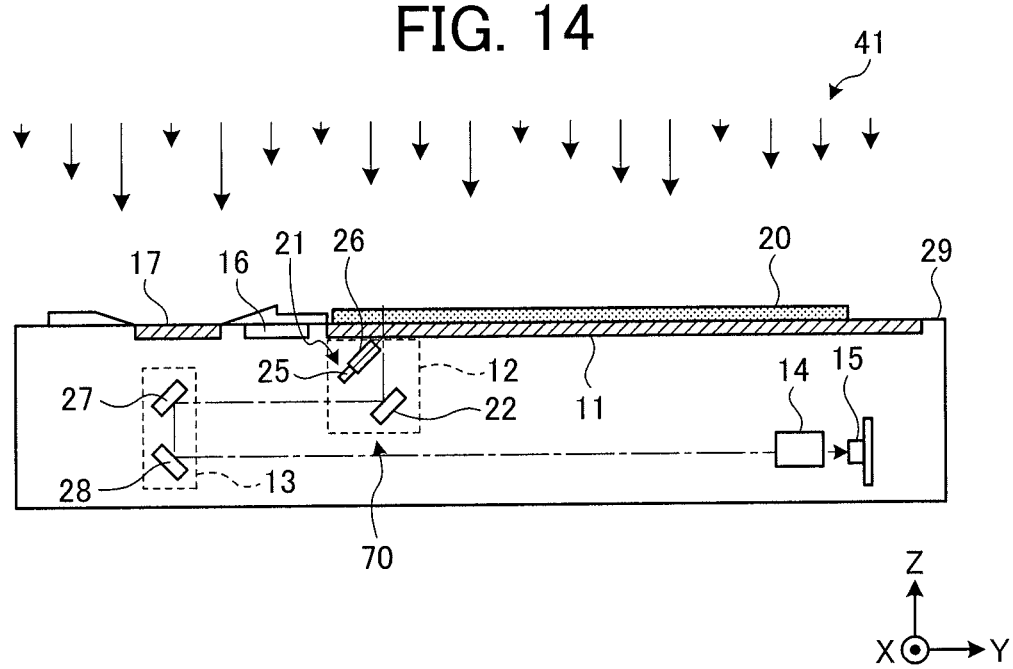
FIG. 14 is a diagram illustrating an exemplary acquiring position of image data at the time of size detection in the embodiment.

FIG. 14 is a diagram illustrating an exemplary acquiring position 70 of image data at the time of the size detection in the embodiment. In FIG. 14, each arrow length of the disturbance light 41 represents intensity of the disturbance light 41. Thus, the intensity of the disturbance light 41 may fluctuate depending on the position on the contact glass 11. Therefore, unlit-state image data and lit-state image data according to the present embodiment are acquired at the acquiring position 70 that is a fixed position within a movement range of the first carriage 12 in the sub-scanning direction (Y-axis direction).

About Illumination Depth

In the present embodiment, detection accuracy for a document size is further improved by making an illumination depth of the scanning light 30 at the time of the size detection shallower than that at the time of the image reading.

Figure 15:
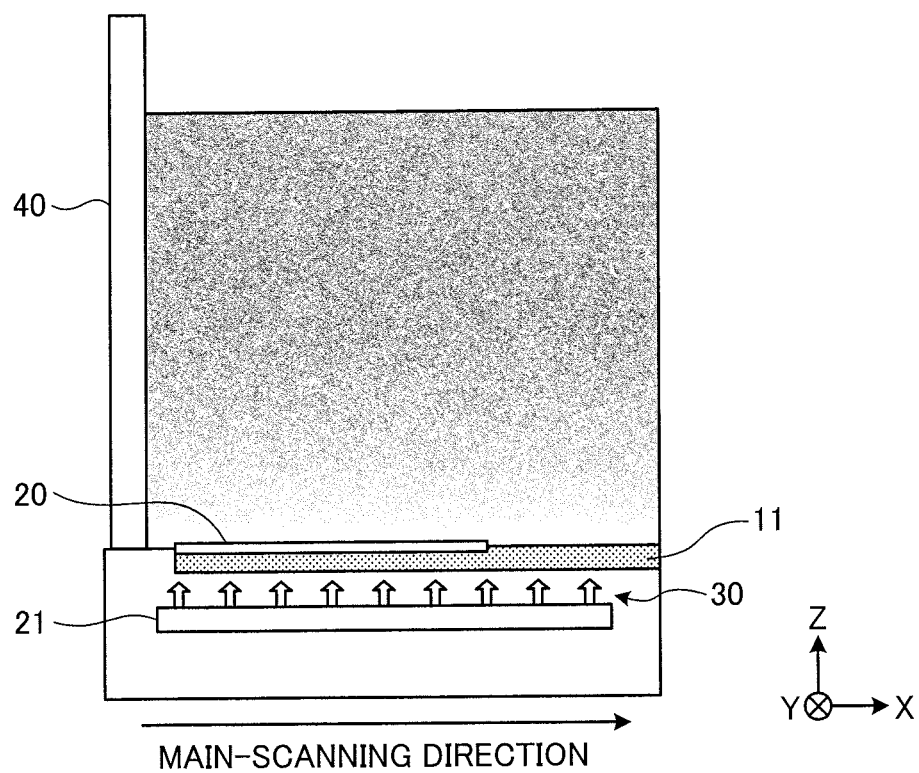
FIG. 15 is a diagram illustrating an exemplary illuminance distribution in a case where an illumination depth of scanning light is relatively deep.
Figure 16:
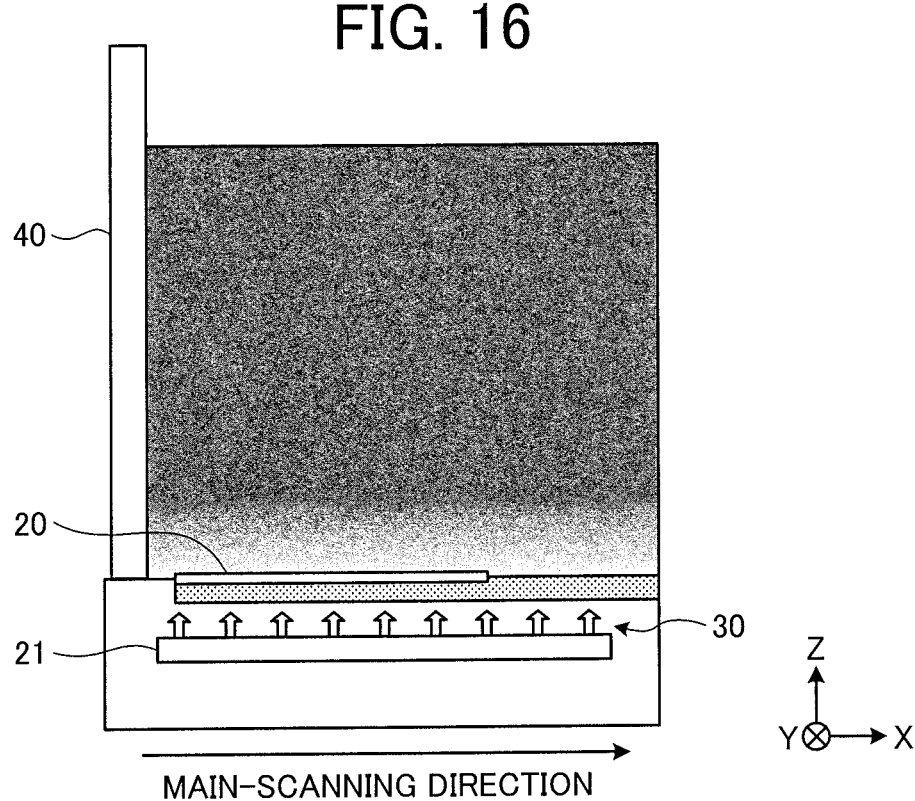
FIG. 16 is a diagram illustrating an exemplary illuminance distribution in a case where the illumination depth of the scanning light is relatively shallow.

FIG. 15 is a diagram illustrating an exemplary illuminance distribution in a case where the illumination depth of the scanning light 30 is relatively deep. FIG. 16 is a diagram illustrating an exemplary illuminance distribution in a case where the illumination depth of the scanning light 30 is relatively shallow. Here, a state in which the background plate 40 (the lower surface of the ADF 18) is completely opened is illustrated.

As illustrated in FIG. 15, when the illumination depth is deep, the scanning light 30 reaches a position considerably distant from a surface of the contact glass 11. In other words, in the state illustrated in FIG. 15, reflection light from an object at a position considerably distant from the surface of the contact glass 11 is received. On the other hand, as illustrated in FIG. 16, in a case where the illumination depth is shallow, the scanning light 30 hardly reaches a position distant upward from the surface of the contact glass 11. In other words, in the state illustrated in FIG. 16, the reflection light from the object located at the position distant from the surface of the contact glass 11 is hardly received.

Figure 17:
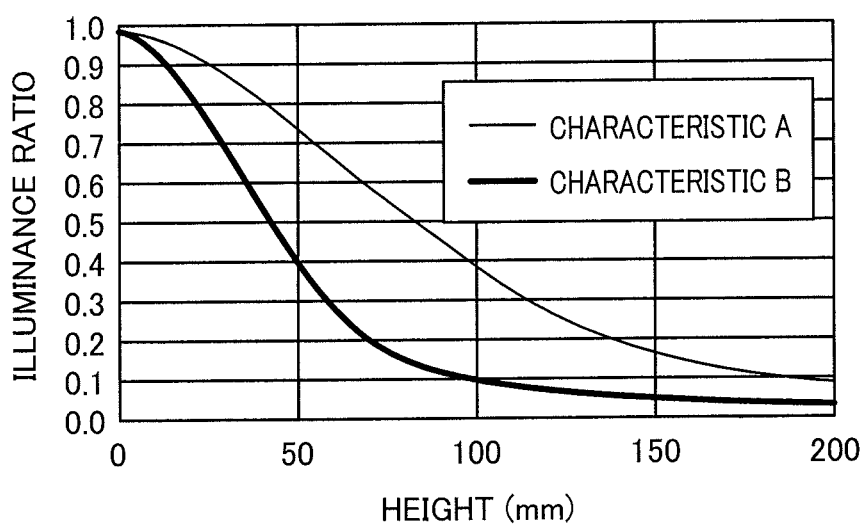
FIG. 17 is a graph exemplifying a difference between illumination depth characteristics.

FIG. 17 is a graph exemplifying a difference between illumination depth characteristics. A horizontal axis of the graph illustrated in FIG. 17 represents a height from the contact glass 11, and a vertical axis represents an illuminance ratio in a case where illuminance on the surface of the contact glass 11 is set to 1. A characteristic A indicates a relation between the height and the illuminance ratio in the case where the illumination depth is relatively deep as illustrated in FIG. 15, and a characteristic B indicates a relation between the height and the illuminance ratio in the case where the illumination depth is relatively shallow as illustrated in FIG. 16. As illustrated in FIG. 17, a change amount in the illuminance ratio (illuminance) relative to a change amount in the height is larger in the characteristic B (in the case where the illumination depth is shallow) than in the characteristic A (in the case where the illumination depth is deep).

As illustrated in the characteristic A, in the case of using the scanning light 30 having the deep illumination depth, reflection light of an object present at a high position distant from the contact glass 11 can be received. Therefore, the scanning light 30 having the deep illumination depth is advantageous at the time of reading a three-dimensional object or the like, for example. However, in a case of attempting to detect the size of the document 20 placed on the contact glass 11 by using the scanning light 30 having the deep illumination depth, reflection light of an object such as the background plate 40 present in the space above the contact glass 11 is received as noise. Therefore, the detection accuracy for the document size may be deteriorated.

Figure 18:
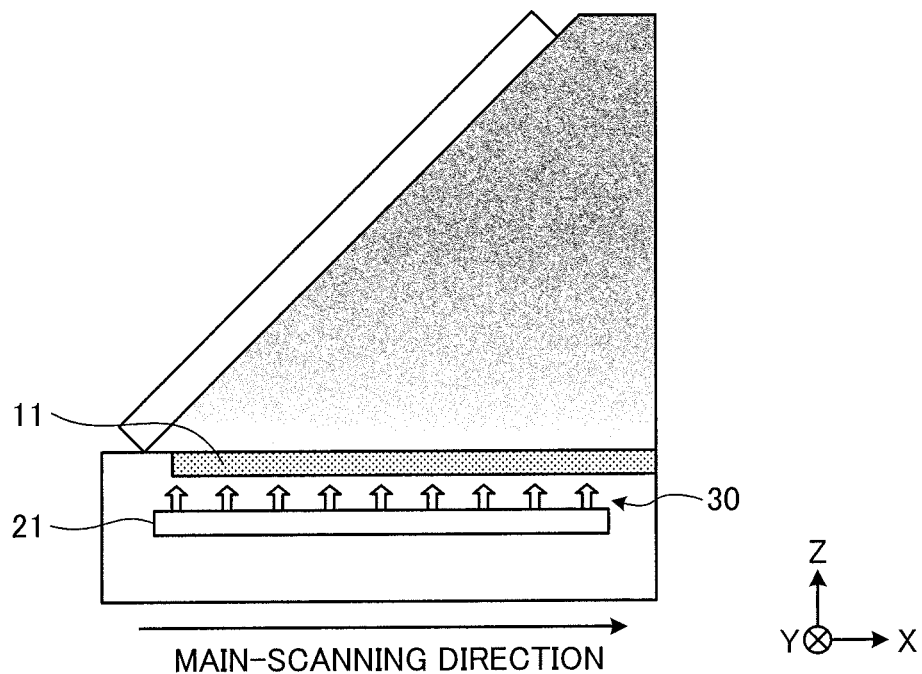
FIG. 18 is a diagram illustrating an exemplary illuminance distribution in a case where the illumination depth of the scanning light is relatively deep and a background plate is not completely opened.
Figure 19:
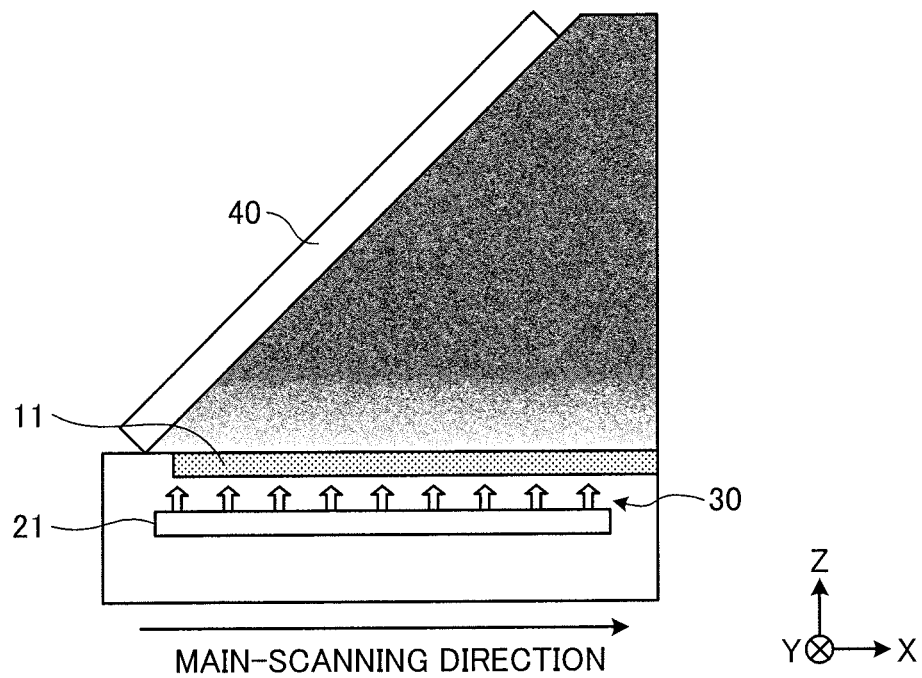
FIG. 19 is a diagram illustrating an exemplary illuminance distribution in a case where the illumination depth of the scanning light is relatively shallow and the background plate is not completely opened.

FIG. 18 is a diagram illustrating an exemplary illuminance distribution in a case where the illumination depth of the scanning light 30 is relatively deep and the background plate 40 is not completely opened. FIG. 19 is a diagram illustrating an exemplary illuminance distribution in a case where the illumination depth of the scanning light 30 is relatively shallow and the background plate 40 is not completely opened.

As illustrated in FIG. 18, in the case of using the scanning light 30 having the deep illumination depth, the intensity of the reflection light from the background plate 40 becomes strong. Therefore, the detection accuracy for the document size may be deteriorated. On the other hand, as illustrated in FIG. 19, in the case of using the scanning light 30 having the shallow illumination depth, the reflection light from the background plate 40 is hardly detected. Therefore, the detection accuracy for the document size can be improved.

Figure 20:
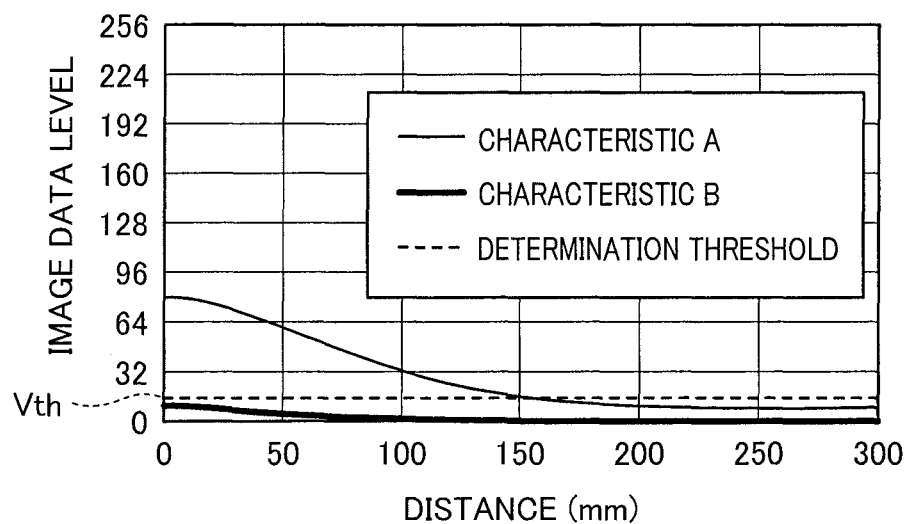
FIG. 20 is a graph exemplifying influence of reflection light from the background plate.

FIG. 20 is a graph exemplifying the influence of the reflection light from the background plate 40. A horizontal axis of the graph illustrated in FIG. 20 represents a distance from a start point in the main-scanning direction of the contact glass 11 (left end in FIGS. 18 and 19), and a vertical axis represents an image data level of the reflection light. In the case of the characteristic A, the image data level of the reflection light from the background plate 40 exceeds the determination threshold Vth in a distance range from the start point to a point near 150 mm. Therefore, there is a possibility of erroneously determining that a document 20 is present in a section from the start point to the point near 150 mm. On the other hand, in the case of the characteristic B, the image data level of the reflection light from the background plate 40 does not exceed the determination threshold Vth in the entire distance range from the start point to the end point (300 mm). Therefore, the erroneous determination caused by the reflection light from the background plate 40 can be suppressed by emitting the scanning light 30 having the illumination depth corresponding to the characteristic B.

As described above, when the illumination depth of the scanning light 30 at the time of the size detection is made shallower than that at the time of the image reading, the erroneous determination caused by reflection light from an object such as the background plate 40 other than the document 20 can be suppressed. Thus, the detection accuracy for the document size can be further improved.

Start of Size Detection Processing

The size detection processing as described above can be started at various kinds of time, and may be started by using, as a trigger, a time when an angle between the contact glass 11 and the background plate 40 becomes a preset angle in a closing motion of the background plate 40, for example. In this case, a detection signal from one sensor that detects an angle of the background plate 40 (ADF 18) can be used.

Alternatively, the size detection processing may be performed after execution of the image reading processing is requested and before the image reading processing is started. In this case, for example, the size detection processing may be started by using, as the trigger, a copy start command operation by a user, reception of a copy start command signal from an external personal computer (PC), or the like.

Use of Reference White Board

The light amount (intensity) of the scanning light 30 emitted from the light source 21 may fluctuate in accordance with a structure of the light source 21 or an environmental condition (such as temperature). In the event of such fluctuation, there is a possibility that the detection accuracy for the document size cannot be guaranteed even though the unlit-state image data and the lit-state image data which are acquired as described above are used as they are. In this case, it is preferable to normalize (correct) the lit-state image data by using reference image data (third image data) acquired based on the reflection light from the reference white board 16. With this normalization, presence/absence of the document 20 can be constantly determined at a constant image data level.

First, an exemplary case where the normalization by the reference image data is not performed is illustrated. Followings are examples of an unlit-state image data level, a lit-state image data level, a determination threshold, and a document presence/absence determination result in a case where there is no fluctuation in the light amount of the scanning light 30.

Unlit-state image data level: 0/255 (black)

Lit-state image data level: 10/255 (high-density document)

Determination threshold: 7/255

(Lit-state image data level)–(Unlit-state image data level)=10: it is determined that a document is present In a case where the light amount of the scanning light 30 is decreased to a half thereof due to heat, the respective values are changed as follows, for example.

Unlit-state image data level: 0/255 (black)

Lit-state image data level: 5/255 (high-density document)

Determination threshold: 7/255

(Lit-state image data level)–(Unlit-state image data level)=5: it is determined that a document is absent As described above, in the case where the normalization based on the reference image data is not performed, there is a possibility that determination on presence/absence of the document 20 may be changed due to decrease in the light amount of the scanning light 30.

Next, an example in a case of normalizing the lit-state image data by using the reference image data will be described. Following are examples of an unlit-state image data level, a lit-state image data level, a reference image data level, a determination threshold, a white level target value, and a document presence/absence determination result in the case where there is no fluctuation in the light amount of the scanning light 30.

Unlit-state image data level: 0/255 (black)

Lit-state image data level: 10/255 (high-density document)

Reference image data level: 200/255 (value obtained by reading the reference white board 16)

Determination threshold: 7/255

White level target value: 200/255 (preset value)

{(Lit-state image data level)–(Unlit-state image data level)}/(Reference image data level)*(White level target value)=(10–0)/200*200=10: it is determined that a document is present In the case where the light amount of the scanning light 30 is decreased to a half thereof due to heat, the respective values are changed as follows, for example.

Unlit-state image data level: 0/255 (black)

Lit-state image data level: 5/255 (high-density document)

Reference image data level: 100/255 (value obtained by reading the reference white board 16)

Determination threshold: 7/255

White level target value: 200/255 (preset value)

{(Lit-state image data level)−(Unlit-state image data level)}/(Reference image data level)*(White level target value)=(5−0)/100*200=10: it is determined that a document is present As described above, in the case of performing the normalization by using the reference image data, a document presence/absence determination result can be the same even though there is fluctuation in the light amount of the scanning light 30.

Structure of LED

Figure 21:
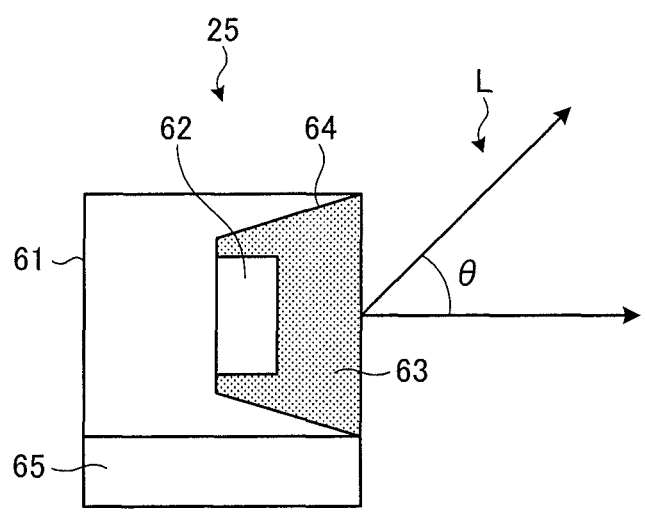
FIG. 21 is a diagram illustrating an exemplary structure of a light-emitting diode (LED) according to the embodiment.

FIG. 21 is a diagram illustrating an exemplary structure of each LED 25 according to the embodiment. The LED (LED chip) 25 exemplified here includes a package 61, a blue LED 62, a yellow phosphor 63, a reflector 64, and a substrate 65. The LED 25 emits light L by supplying the drive current to the blue LED 62 via the substrate 65. An angle between a direction perpendicular to a light emitting surface of the blue LED 62 and an emitting direction of the light L is defined as an emission angle θ. The LED 25 according to the present example has a characteristic in which directivity (relation between the emission angle θ and the intensity of the light L) is changed in accordance with the drive current.

Figure 22:
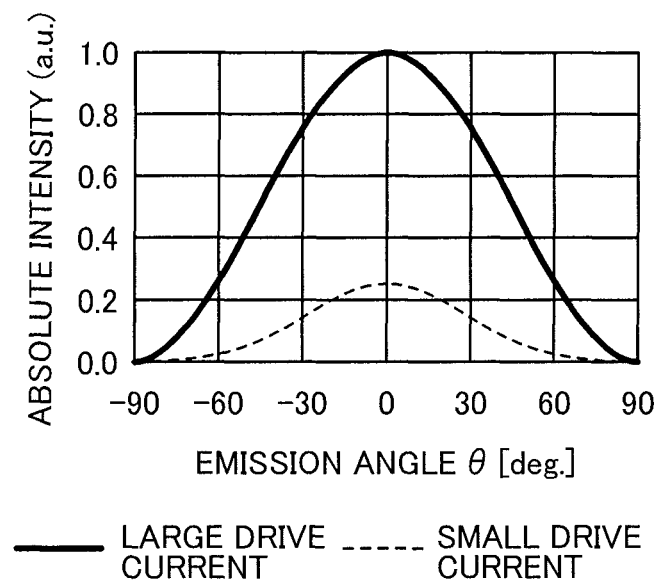
FIG. 22 is a graph illustrating directional characteristics of the LED according to the embodiment.
Figure 23:
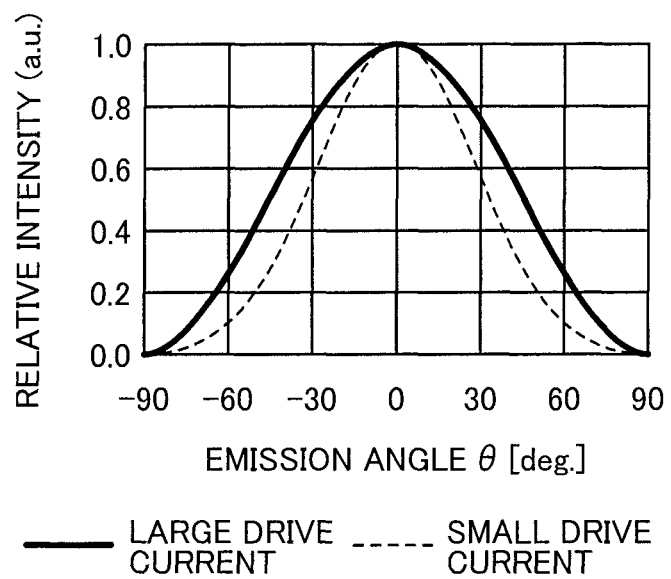
FIG. 23 is a graph obtained by normalizing the graph illustrated in FIG. 22.

FIG. 22 is a graph illustrating directional characteristics of the LED 25 according to the embodiment. FIG. 23 is a graph obtained by normalizing the graph illustrated in FIG. 22. A horizontal axis in each of the graphs illustrated in FIGS. 22 and 23 represents the emission angle θ, and a vertical axis thereof represents absolute intensity of the light L. FIGS. 22 and 23 respectively illustrate a relation between the emission angle θ and the absolute intensity in a case where the drive current is relatively large (solid line) and a relation between the emission angle θ and the absolute intensity in a case where the drive current is relatively small (dotted line). FIG. 23 is the graph obtained by normalizing, to 1.0, maximum intensity in each of the two kinds of data in the cases where the drive current is large/small illustrated in FIG. 22.

FIGS. 22 and 23 exhibit a fact that the directional characteristic of the light L is changed in accordance with a change in the drive current, specifically, a fact that the directivity becomes stronger when the drive current is decreased. The stronger the directivity of the LED 25 is, the more deteriorated the illumination depth characteristic is. Therefore, with reduction of the drive current at the time of the size detection more than the drive current at the time of the image reading, the illumination depth of the scanning light 30 at the time of the size detection can be made shallower than the illumination depth of the scanning light at the time of the image reading. Note that the case where the blue LED 62 and the yellow phosphor 63 are combined to obtain a white LED is exemplified here, but an LED configuration used in the light source 21 is not limited thereto. For example, it is also possible to use an LED or the like in which an ultraviolet LED and a phosphor are combined.

Reading Cycle at Time of Size Detection

In the present embodiment, the light amount of the scanning light 30 at the time of the size detection is normally smaller than the light amount of the scanning light 30 at the time of the image reading. For example, in the case of using the LED 25 having the above-described configuration, the light amount of the scanning light 30 at the time of the size detection becomes smaller than the light amount of the scanning light 30 at the time of image reading. At the time of the size detection, the scanning light 30 is switched on at timing not expected by a user. Therefore, having the small light amount of the scanning light 30 is advantageous in terms of alleviating unpleasant feeling given to the user. However, when the light amount of the scanning light 30 is decreased, a data amount acquired by the imaging element 15 per unit time is also decreased.

Accordingly, it is preferable to elongate a reading cycle (a light receiving period of the imaging element 15) at the time of the size detection more than a reading cycle at the time of the image reading.

Figure 24:
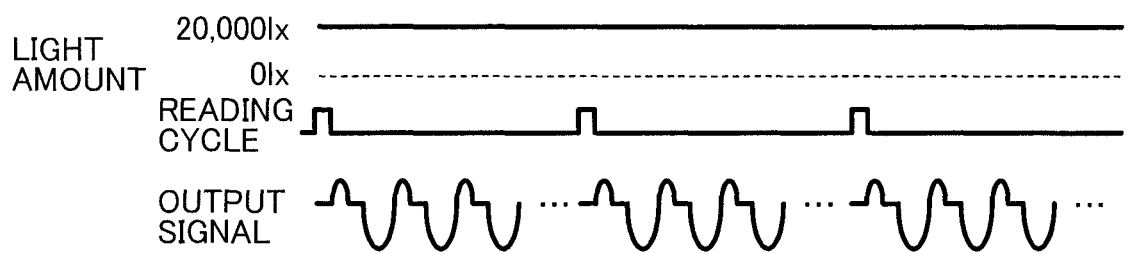
FIG. 24 is a chart illustrating an exemplary reading cycle at the time of image reading according to the embodiment.
Figure 25:
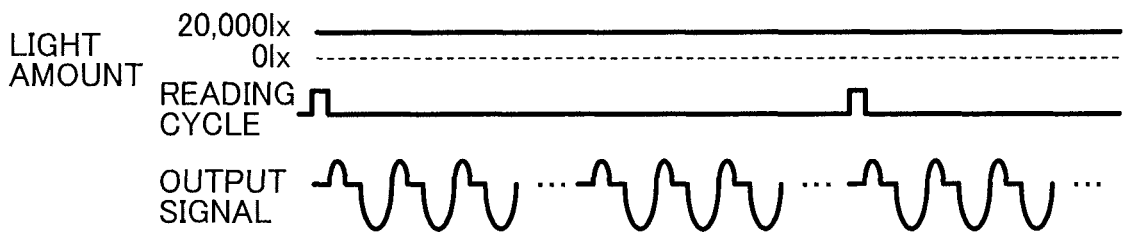
FIG. 25 is a chart illustrating an exemplary reading cycle at the time of size detection according to the embodiment.

FIG. 24 is a chart illustrating an exemplary reading cycle at the time of the image reading according to the embodiment. FIG. 25 is a chart illustrating an exemplary reading cycle at the time of the size detection according to the embodiment. FIGS. 24 and 25 exemplify a relation between the light amount of the scanning light 30, the reading cycle, and an output signal of the imaging element 15.

In the present example, the light amount at the time of the image reading is 20000 lx, and the light amount at the time of the size detection is 10000 lx. Here, the reading cycle at the time of the size detection is twice the reading cycle at the time of the image reading. Thus, with the increase of the reading cycle (light receiving time) so as to compensate the decrease in the light amount of the scanning light 30, an output signal having a level equivalent to a level of an output signal at the time of the image reading can be also acquired at the time of the size detection.

Configuration of Image Forming Apparatus

Figure 26:
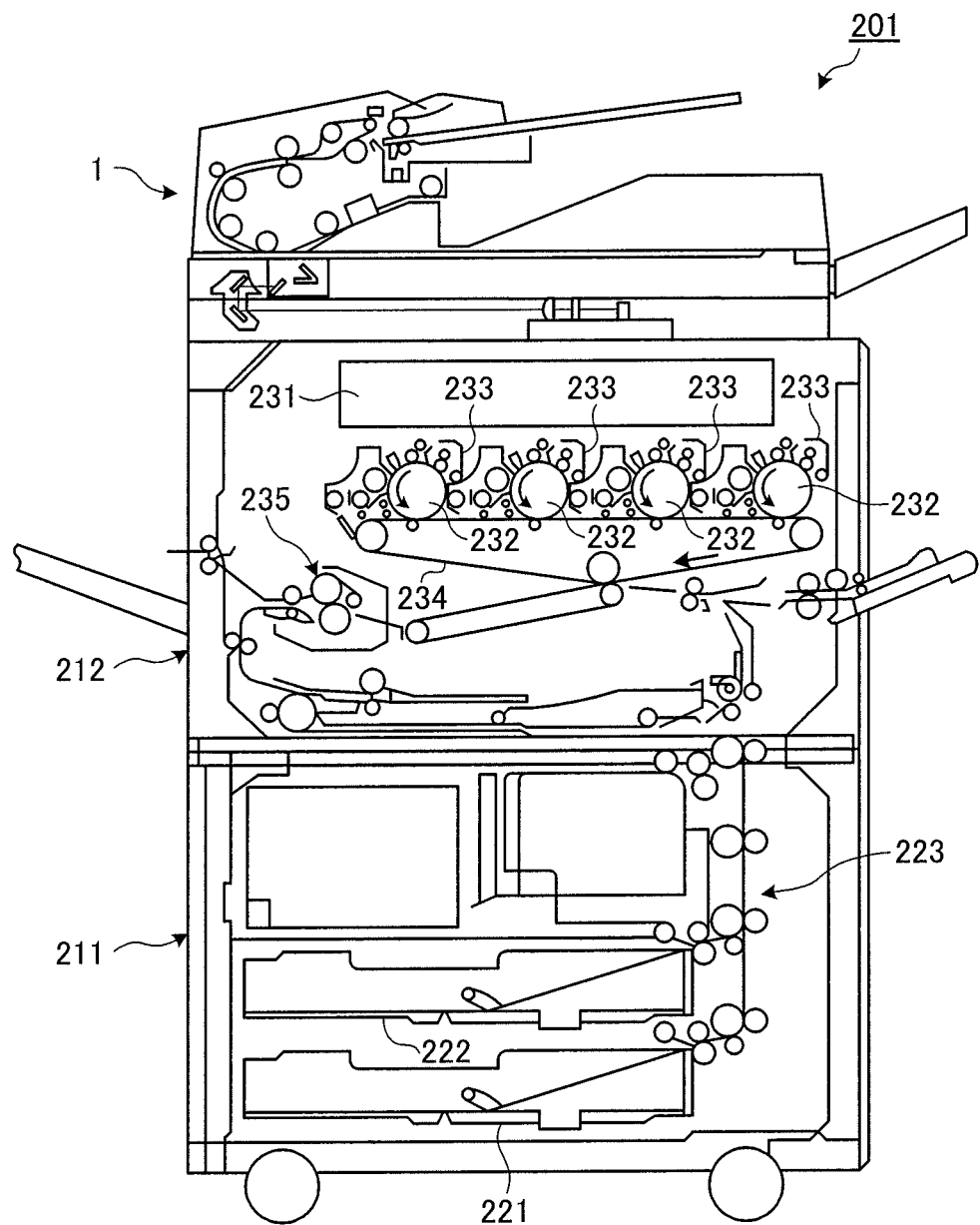
FIG. 26 is a view illustrating an exemplary configuration of a copy machine according to an embodiment.

FIG. 26 is a view illustrating an exemplary configuration of a copy machine 201 according to an embodiment. The copy machine 201 is an exemplary image forming apparatus including the above image reading device 1 and the above document size detection device 101. The copy machine 201 includes an image reading device 1, a sheet feeder 211, and an image forming device 212.

The sheet feeder 211 includes: sheet feeding cassettes 221 and 222 storing recording sheets (recording media) of different sizes, and a sheet feeding means 223 including various kinds of rollers that convey the recording sheets stored in the sheet feeding cassettes 221 and 222 to an image forming position of the image forming device 212.

The image forming device 212 includes an exposure device 231, a photoconductor drum 232, a developing device 233, a transfer belt 234, and a fixing device 235. The image forming device 212 exposes the photoconductor drum 232 by the exposure device 231 based on image data of a document 20 read by the image reading device 1 to form a latent image on the photoconductor drum 232, and the developing device 233 supplies toners of different colors to the photoconductor drum 232 so as to perform development. Subsequently, the image forming device 212 transfers the image developed on the photoconductor drum 232 by the transfer belt 234 onto a recording sheet fed from the sheet feeder 211, and then the toner of the toner image transferred onto the recording sheet by the fixing device 235 is melted and a color image is fixed on the recording sheet.

As described above, according to the present embodiment, the influence of the disturbance light 41 is eliminated at the time of the size detection based on: the difference between the unlit-state image data acquired in the state in which the scanning light 30 is switched off; and the lit-state image data acquired by using the scanning light 30 having the illumination depth shallower than that at the time of the image reading. Thus, the influence of the disturbance light 41 can be sufficiently eliminated even in the case of setting the determination threshold Vth that is used to determine presence of a document 20 relatively low, and even in a case of the document 20 having the high-density image surface, the size thereof can be detected with high accuracy.

A program to implement functions of the document size detection device according to the above embodiment may be provided as a file in an installable format or an executable format by being recorded in a computer-readable recording medium such as a compact disc read only memory (CD-ROM), a flexible disk (FD), a compact disc recordable (CD-R), or a digital versatile disk (DVD). Alternatively, the program may be stored on another computer connected to a network such as the Internet, and may be provided by being downloaded via the network. Also, the program may be provided or distributed via the network.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A document size detection device, comprising:
    a light source configured to irradiate a document placed on a transparent member with scanning light via the transparent member;
    a reading unit including an image sensor configured to receive reflection light from the document via the transparent member to acquire image data of the document; and
    circuitry configured to switch the scanning light on or off, control an illumination depth of the scanning light, and detect a size of the document based on the image data acquired by the reading unit,
    wherein the circuitry is further configured to
        set an illumination depth of the scanning light, at a size detection time when the size is detected, to be less than an illumination depth of the scanning light at an image reading time when an image of the document is read,
        set, at the size detection time, a determination threshold to a value lower than a value of the determination threshold at the image reading time, and
        detect, at the size detection time, the size by comparing, to the set determination threshold, a calculated difference between first image data acquired in a state in which the scanning light is switched off and second image data acquired in a state in which the scanning light is switched on.

2. The document size detection device according to claim 1,
    wherein the scanning light is linear light along a main-scanning direction of the document, and
    the circuitry is further configured to detect a width in the main-scanning direction of the document.

3. The document size detection device according to claim 1,
    wherein the light source includes a light emitting diode (LED), and
    the circuitry is further configured to set a drive current in the LED at the size detection time to be smaller than drive current in the LED at the image reading time.

4. The document size detection device according to claim 1,
    wherein the circuitry is further configured to start processing to detect the size when an angle between the transparent member and a background member covering the transparent member becomes a preset angle.

5. The document size detection device according to claim 1,
    wherein the circuitry is further configured to start processing to detect the size after receiving a trigger signal that starts image reading processing and before starting the image reading processing.

6. The document size detection device according to claim 1,
    wherein the reading unit is further configured to acquire the first image data and the second image data at a same position in a sub-scanning direction.

7. The document size detection device according to claim 1, further comprising a reference color member having a color to be a reference,
    wherein the light source is further configured to irradiate the reference color member with the scanning light,
    the reading unit is further configured to receive reflection light from the reference color member to acquire third image data, and
    the circuitry is further configured to correct the second image data based on the third image data.

8. The document size detection device according to claim 1,
    wherein a light amount of the scanning light at the size detection time is smaller than a light amount of the scanning light at the image reading time, and
    a light receiving time of the reflection light at the size detection time is longer than a light receiving time of the reflection light at the image reading time.

9. An image reading device comprising the document size detection device according to claim 1, wherein the reading unit is further configured to read an image of a document having the size detected by the circuitry.

10. The document size detection device of claim 1, wherein a light receiving time of the reflection light at the size detection time is longer than a light receiving time of the reflection light at the image reading time.

11. The document size detection device of claim 1, wherein a light amount of the scanning light at the size detection time is smaller than a light amount of the scanning light at the image reading time.

12. The document size detection device of claim 1, wherein the circuitry is further configured to subtract the first image data from the second image data to obtain corrected image data, and detect the size based on the corrected image data.

13. An image forming apparatus comprising:
    the image reading device according to claim 9; and
    an image forming device configured to print, on a recording medium, an image read by the image reading device.

14. A document size detecting method, performed by a document size detection device, the method comprising:
    irradiating a document with scanning light via a transparent member on which the document is placed;
    receiving reflection light from the document via the transparent member to acquire image data of the document; and detecting a size of the document based on the image data, the detecting step including acquiring, as first image data, image data of the document in a state in which the scanning light is switched off;

controlling a light source such that an illumination depth of the scanning light at a size detection time of size detection becomes less than an illumination depth of the scanning light at an image reading time of reading an image of the document;

acquiring, as second image data, image data of the document in a state in which the scanning light is switched on;

setting, at the size detection time a determination threshold to a value lower than a value of the determination threshold at the image reading time; and detecting the size of the document by comparing, to the set determination threshold, a difference between the first image data and the second image data.

15. A non-transitory recording medium which, when executed by one or more processors, cause the processors to perform a document size detection method comprising:

irradiating a document with scanning light via a transparent member on which the document is placed;

receiving reflection light from the document via the transparent member to acquire image data of the document; and detecting a size of the document based on the image data, the detecting step including acquiring, as first image data, image data of the document in a state in which the scanning light is switched off;

controlling a light source such that an illumination depth of the scanning light at a size detection time of size detection becomes less than an illumination depth of the scanning light at an image reading time of reading an image of the document;

acquiring, as second image data, image data of the document in a state in which the scanning light is switched on;

setting, at the size detection time, a determination threshold to a value lower than a value of the determination threshold at the image reading time; and detecting the size of the document by comparing, to the set determination threshold, a difference between the first image data and the second image data.

* * * * *